May 14, 1940.                 G. W. BUNGAY                 2,200,536
              METHOD OF AND APPARATUS FOR MAKING ELECTROTYPES
                        Filed May 21, 1937          4 Sheets-Sheet 2
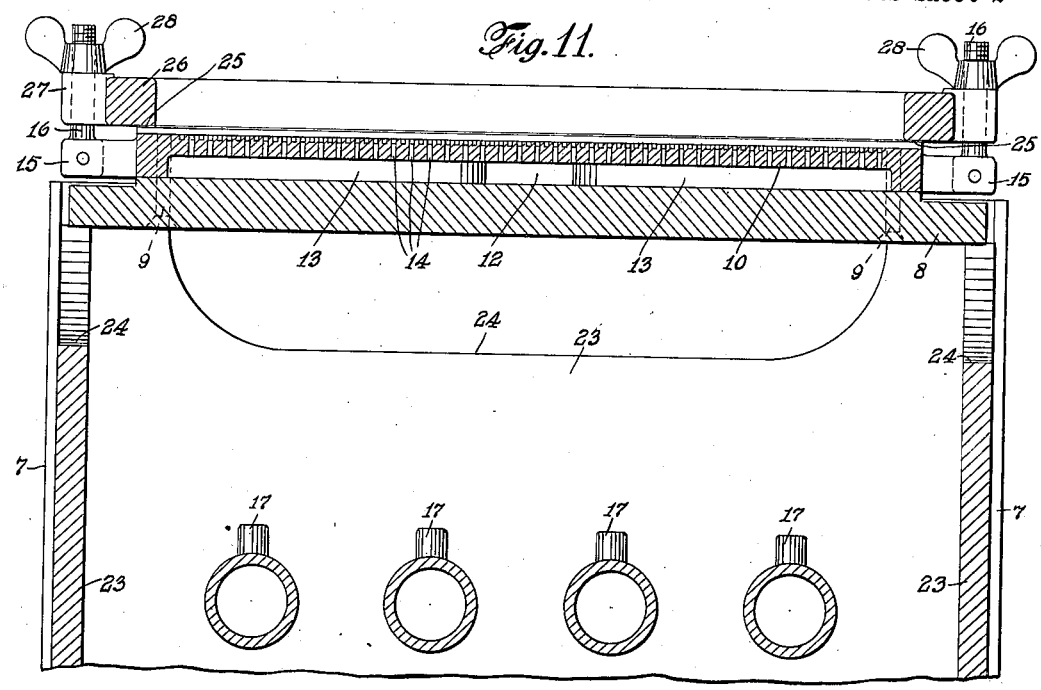
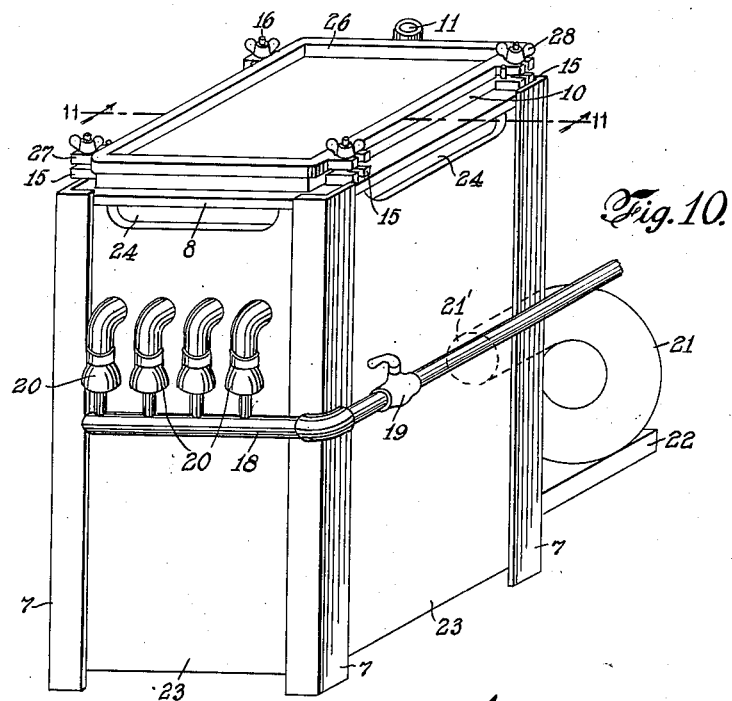
George W. Bungay INVENTOR.
BY Wm. J. Critchard ATTORNEY.

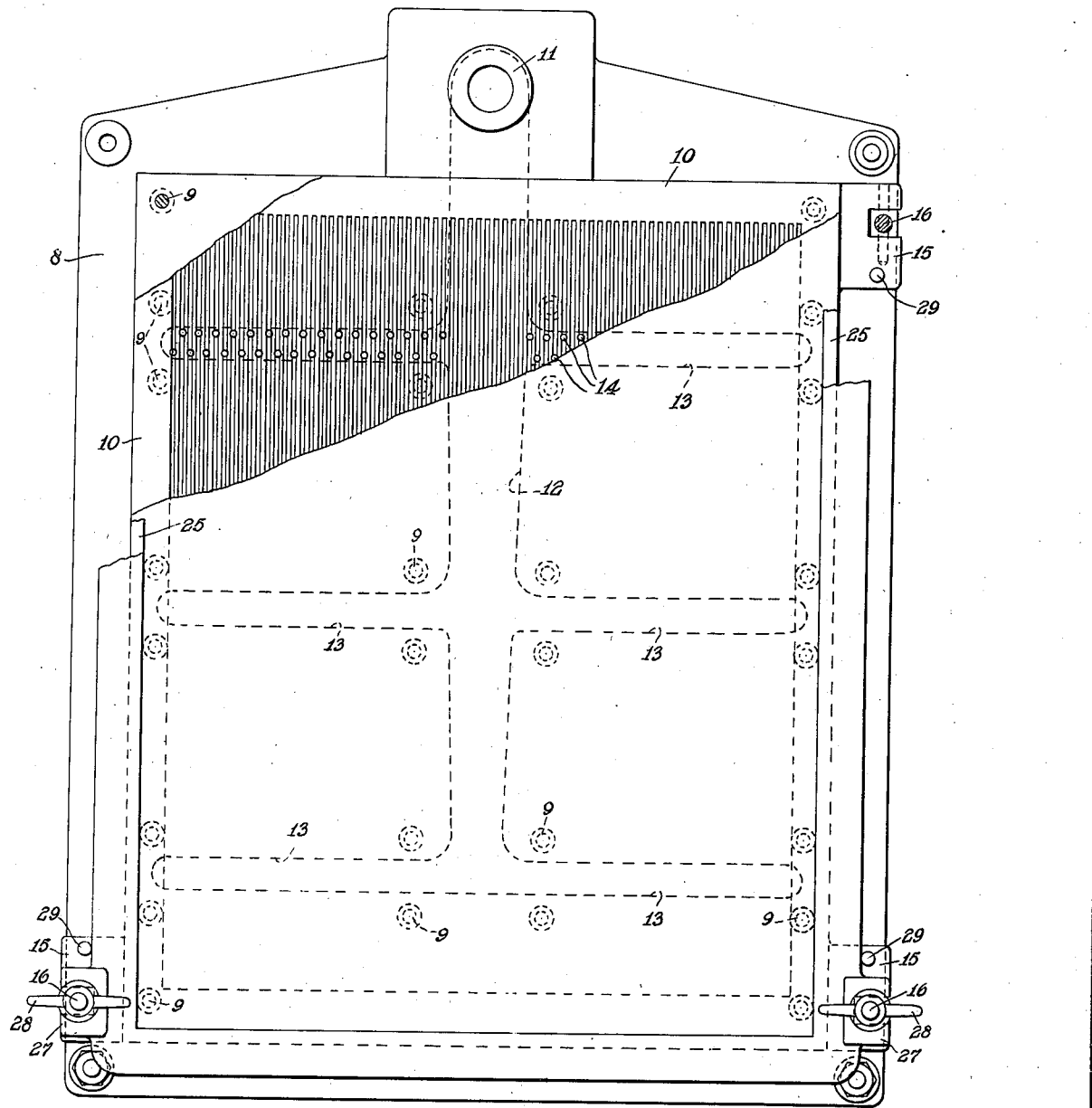

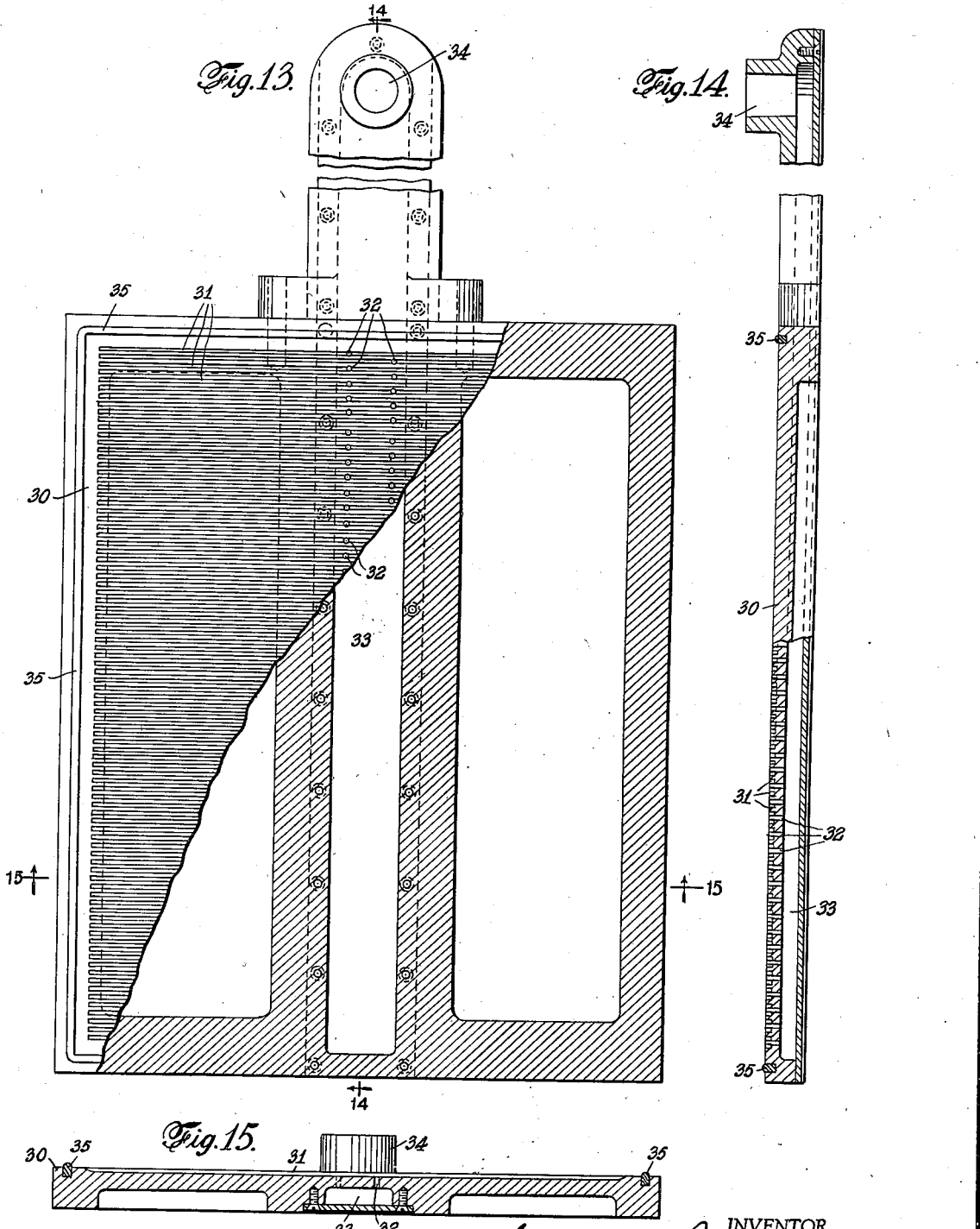

Patented May 14, 1940

2,200,536

UNITED STATES PATENT OFFICE 2,200,536

METHOD OF AND APPARATUS FOR MAKING ELECTROTYPES

George W. Bungay, New York, N. Y.

Application May 21, 1937, Serial No. 143,876

4 Claims. (Cl. 29—21)

This invention relates to electrotypes for use in printing. More particularly, this invention relates to a method of and apparatus for producing electrotypes.

In accordance with the principles of the instant invention, a photoengraving of the subject to be ultimately printed is prepared on rolled and polished copper in the usual manner. A lead impression is made from the photoengraving and the lead impression after stripping from the photoengraving is provided with a backing comprising, preferably, a nickel layer or coating and a coating or layer of copper on the nickel. During the application of the nickel and the copper coatings or layers, precautions are taken to keep the plates in a flat condition. After the application of the nickel and copper coatings, the lead impression is stripped therefrom whereby a shell is produced.

The shell resulting from the operations previously described is now backed up as hereafter more fully described. After treating the copper surface with a suitable flux, a sheet of tin foil is placed thereon. The shell, with the impression surface thereof facing downwardly, is then placed on a horizontally disposed support which is heated and provided with means, whereby the shell is rigidly maintained thereon in a horizontal position. Due to the fact that the support is maintained at a suitable elevated temperature, the tin foil melts very quickly after the shell has been placed upon the support. A suitable white metal alloy in molten condition is then puddled and wiped into the molten surface. Thereafter, the shell, while it is still secured to the support, is cooled and, after being sufficiently cooled, it is removed from the support.

Prior to the puddling and wiping operation, a frame constituting a removable dam is positioned along the marginal edges of the shell and securely fastened to the support, for reasons which will become apparent hereafter. Means cooperating with both the dam and the shell make the joints therebetween liquid-tight.

The backed shell is now finished by removing in any suitable manner, as by milling, shaving, etc., the alloy backing as well as a substantial portion of the copper shell. During this finishing operation, it is to be noted that the plate is also maintained in a substantially flat position.

After the desired quantity of metal has been removed, the edges are trimmed.

The horizontally disposed support on which the shell is backed in its preferred form comprises a vacuum plate. This support is also disposed in such a manner that it can be heated and also so that it can be cooled.

In the preferred embodiment of the process, the alloy coating and a substantial portion of the copper coating are removed by cutting or shaving the same from the articles by a suitable milling machine. The plate during this operation is maintained in a horizontal position. In one embodiment of the invention the traveling bed of the milling machine is provided with a vacuum plate on which the shell is placed. Means are also provided for providing a tight seal between the plate and the article secured thereto. In the event that the shell has or contains large intaglio portions, these portions may be filled in with any suitable composition prior to the finishing operation.

It is to be noted that during the backing process and the finishing operation the shell is maintained in a substantially horizontal position, and that it is also maintained in such a manner as to substantially inhibit warping, buckling, etc.

In order to more clearly explain the invention, an illustrative embodiment of the process as well as an illustrative embodiment of the apparatus employed therein will be described in conjunction with the accompanying drawings forming a part of this specification and wherein:

Figure 10 is a perspective view of the apparatus used in the backing operation.

Figure 11 is a section taken on lines 11, 11 of Figure 10.

Figure 12 is a top plan view partly in section of the backing apparatus.

Figure 13 is a top plan view of the vacuum plate on the milling machine.

Figure 14 is a section taken on line 14, 14 of Figure 13.

Figure 15 is an end section taken on line 15, 15.

Figure 1:
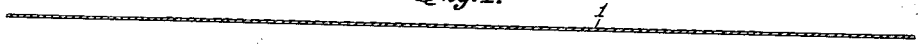
Figure 1 illustrates diagrammatically a cross-section of the subject matter to be reproduced.
Figure 2:
Figure 2 illustrates diagrammatically a cross-section of a photoengraving made of the subject matter of Figure 1.
Figure 3:
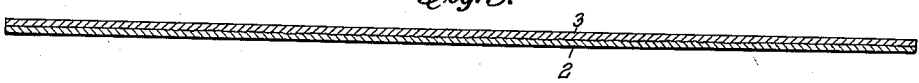
Figures 3, 4, 5, 6, 7 and 8 illustrate diagrammatically cross-sections of the electrotype shell at various stages in the process.
Figure 4:
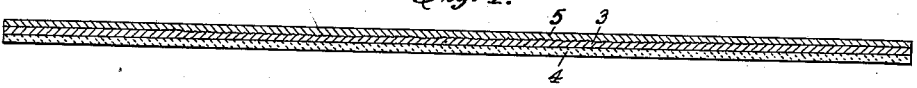
Figure 5:
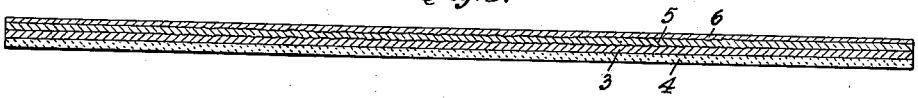

Referring now to the drawings wherein like reference numerals designate like parts, the reference numeral 1 designates diagrammatically the subject which is to be ultimately reproduced by printing. A photoengraving 2 on rolled copper is made of the subject 1. A lead impression is next made of the photoengraving. This is secured by placing a sheet of lead or tin-coated lead 3 on the photoengraved surface of the photoengraving 2 and subjecting the same to a very high pressure, such as seven to eight tons per square inch, whereby the lead or tin-coated lead sheet is made to conform to the photoengraved surface of the photoengraving 2. The lead impression 3 after stripping is then disposed on a wax case diagrammatically illustrated by the reference numeral 4. After treating the face of the shell with a releasing solution, for example, a very weak solution of potassium dichromate, the assembly is immersed in a plating bath containing a nickel salt, and a coating of nickel 5 is electrolytically deposited on to the exposed lead surface. I have found that satisfactory results are secured if the deposition is a slow one, such as one continued for about 1 hour. After the nickel has been deposited to the desired thickness, the assembly is removed from the nickel plating bath and is introduced into a copper plating bath, where a coating of copper 6 is deposited on to the exposed nickel surface. I have found that a suitable thickness of copper can be obtained when the copper deposition is maintained for approximately 12 hours. It is to be understood that the nickel and copper coatings are not uniform and smooth. As a matter of fact, these coatings are irregular, there being both high and low spots in each of said coatings.

Figure 6:
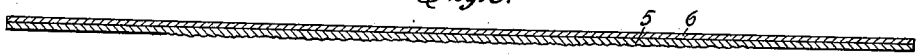
Figure 7:
Figure 8:

After removal from the plating bath, preferably after washing and drying, the combined nickel and copper shell is stripped from the wax support 4 and the lead impression, with the result that there results an electrotype shell consisting of the successive nickel coating 5 and copper coating 6 as diagrammatically shown in Figure 6 of the drawings. The releasing solution above referred to facilitates the stripping operation just described.

The exposed copper surface 6 is treated with a suitable flux, and a sheet of tin foil approximately two-thousandths of an inch thick and free of lead is positioned on the fluxed surface. Any suitable fluxing agent may be used. I have secured satisfactory results when I used the usual hydrochloric acid-zinc fluxing solutions. The shell with the sheet of tin foil is then placed in the backing apparatus more fully illustrated in Figures 10-12 of the drawings.

Referring now to Figures 10-12 and particularly Figure 10, the backing apparatus comprises a plurality of vertically extending legs 7 formed of any suitable material, such as steel or cast-iron angle irons. The lower ends of the legs 7 may be positioned on the floor or on any other suitable foundation. Secured to the upper extremities of the legs 7 in any suitable fashion is a plate 8 to which there is secured in any suitable manner as, for example by stud screws 9 a vacuum plate 10. The vacuum plate 10 is at one end thereof provided with a connection 11, whereby it may be connected to a suitable vacuum pump (not shown). The connection 11 communicates with a manifold channel 12 which extends substantially throughout the entire length of the vacuum plate 10 and communicates with branches 13. Though in the drawing (see Figure 12) six branches 13 are illustrated, it is to be understood that the invention is not restricted to this precise number. Any other number of channels may be used and indeed, if desired, any number of manifolds 12 may be used. The branches 13 communicate with a plurality of holes 14, preferably disposed immediately above the channels as shown in Figure 12. The entire surface of the plate 10 is slotted or provided with narrow grooves, and the holes 14 are usually between the ridges and in the groove. The plate 10 adjacent the four corners thereof is provided with lugs 15 in which bolts 16 are pivotally mounted.

It is to be understood that it is not necessary that plates 8 and 10 be made separately and then assembled as described. If desired, a single casting embodying the features of the plates 8 and 10 may be used.

The apparatus is provided with means for heating the vacuum plate 10. Though various heating means may be used, in the embodiment shown the heating is secured by means of gas burners 17 disposed beneath the vacuum plate 10. Gas is supplied to the burners 17 through a line 18 connected to a suitable source of supply (not shown). A valve 19 is positioned in the line so that the operator may control the quantity of gas to the burners or turn it on or off as desired. If desired, the gas burners may be provided with slide valves 20, whereby air may be permitted to mix with the gas in order to obtain good combustion.

Since, as will become apparent, the vacuum plate 10 is to be cooled during the process, means are provided for accomplishing this result. In the embodiment shown, this is secured by a blower 21 mounted on a suitable support 22 and having its exit end 21' beneath the plate 10. When it is desired to cool the plate 10, the blower is caused to operate with the result that air is blown through the exit end 21' with the result that the plate 10 is cooled. The exit end 21' may be at any desired place beneath the vacuum plate.

The backing apparatus is also provided with walls 23 which are securely fastened to the uprights 7 in any convenient manner. Due to the fact that it is desired to have the walls insulated, I prefer to make said walls of asbestos. In order to provide inspection ports and also to permit the passage of the cooling air through the apparatus, the walls are provided with openings 24 adjacent the top thereof.

The shell provided with the tin foil is placed on the vacuum plate 10 which has previously been or is heated to a temperature of the order of 550° F. Prior to the disposition of the shell on the vacuum plate, the vacuum pump is started with the result that, as soon as the shell is placed thereon, it is securely and flatly held in position. Due to the fact that the vacuum plate 10 is heated to approximately 550° F., the tin foil melts. After the shell has been placed on the vacuum plate, due to the irregularities in the electro-deposited coatings at the back of the shell, a gasket 25 is placed along the marginal edges of the shell and a frame 26 positioned thereon. The frame 26 adjacent its four corners is provided with bifurcated lugs 27 which cooperate with the pivoted bolts 16. When the frame is placed in position, the bolts 16 are swung into the bifurcated lugs 27 and the wing nuts 28 are screwed home, whereby the frame is securely fastened to the vacuum plate. If desired, the vacuum plate 10 and the frame 26 may be provided with means, whereby the frame may be positioned accurately in a very short interval of time. In the form shown the plate 10 is provided with pins 29 which cooperate with holes in the frame 26.

The frame 26 constitutes a removal dam and the gasket 25 disposed between the frame and the shell makes the joints therebetween liquid-tight. The gasket may be made of any material which is soft or resilient and resists the heat at the temperatures employed in the process. Gaskets made of soft card-board have given satisfactory results.

After the gasket and frame have been positioned as previously described, a previously molten white metal alloy at a temperature in the neighborhood of 700° F. and consisting of 20 to 25 parts antimony, 5 parts copper and the remainder tin (the proportions being by weight) is puddled and wiped into the exposed surface with a wire brush. When the required quantity of alloy has been puddled and wiped into the surface, the valve 19 is manipulated to cut off the supply of gas and the blower 21 started with the result that the vacuum plate 10, and hence the shell thereon, is cooled. When the plate has sufficiently cooled to permit handling, the frame is removed and the backed shell also removed from the backing apparatus.

Figure 9:
Figure 9 illustrates diagrammatically a cross-section of the electrotype prepared by the instant invention.

The backed shell is now ready for finishing. The finishing operation comprises removing the alloy 6' and a substantial portion of the copper 6. After this has been done, the shell is trimmed to make it into a plate of the desired dimensions. Figure 9 is a diagrammatic illustration of the finished plate. Due to the fact that the copper coating is irregular, the back of the finished plate is smooth and consists of copper 6 having white metal alloy 6' in the low points or valleys of the original copper coating.

The removal of the alloy and the substantial portion of the copper is effected on a milling machine, wherein the cutter is horizontally disposed. Means are provided to securely hold the shell on the machine during the milling operation. Though various means may be utilized for securely holding the shell in flat condition on the bed of the milling machine during the finishing operation, I prefer to securely hold the shell by means of a vacuum plate secured to the traveling bed of the machine. In the preferred form of this phase of the invention, a vacuum plate 30 is securely fastened to the traveling bed of the milling machine. The plate is provided with a slotted or grooved surface 31 having holes 32 communicating with the channel 33 in the plate. The channel 33 is connected through 34 to a vacuum pump (not shown).

In order to rigidly secure the shell on the plate 30, the latter adjacent its edges is provided with a rubber gasket 35 as shown in Figures 13-15 inclusive. This rubber gasket cooperating with the shell positioned on the vacuum plate forms air-tight joints, whereby the vacuum plate will securely hold in place the article to be milled. In the preferred form of the invention the vacuum plate 30 is positioned on the bed of the machine so that one corner thereof passes beneath the cutter at the beginning of the operation. In other words, the vacuum plate 30 is disposed in such a position that the front corner of the plate is at an angle of approximately 45° to the vertical axis of the rotary cutter. By this construction the backed shell is fed to and cut by the cutter while said shell is disposed diagonally with respect to the cutter. This relationship between the cutter and shell permits the former to begin to operate on a small portion of the latter. As a consequence, the tendency of the shell to jump during at least the beginning of the milling operation is eliminated.

When the shell contains large intaglio portions in the printing face thereof, it is desirable and advantageous to fill in these portions, so that they will be flush with the printing surfaces, with a suitable composition prior to the finishing operation. This permits the printing face of the shell to be held in a substantially flat condition during the milling operation, whereby an electrotype having a substantially even and smooth back is produced. After the milling operation, the composition is removed in any suitable manner. As an illustrative example of a suitable composition may be mentioned plaster of Paris.

It is to be noted that during the backing process and the finishing process the shell is maintained perfectly flat in a horizontal position, and that precautions are taken to prevent buckling, warping, etc., thereof.

Since it is obvious that various changes and modifications may be made in the above description without departing from the nature or spirit thereof, this invention is not restricted thereto except as set forth in the appended claims.

I claim:

1. In a method of making electrotypes, the steps which comprise filling in the intaglio portions of the printing face of a backed shell so that the filled-in portions will be flush with the printing surfaces of said printing face, positioning the thus-treated backed shell on a traveling bed of a milling machine with the filled-in face directly in contact with said traveling bed, holding said shell in position on said bed by a vacuum, and cutting away a sufficient amount of backing metal to produce an electrotype of the desired thickness.

2. In a method of making electrotypes, the steps which comprise filling in the intaglio portions of the printing face of a backed shell so that the filled-in portions will be flush with the printing surfaces of said printing face, positioning the thus-treated backed shell diagonally on a traveling bed of a milling machine with the filled-in face directly in contact with said traveling bed so that one corner of the shell passes beneath the cutter at the beginning of the cutting operation, holding said shell in position on said bed by a vacuum, and cutting away a sufficient amount of backing metal to produce an electrotype of the desired thickness.

3. In a method of making electrotypes, the steps which comprise filling in the intaglio portions of the printing face of a backed shell with plaster of Paris so that the filled-in portions will be flush with the printing surfaces of said printing face, positioning the thus-treated backed shell on a traveling bed of a milling machine with the filled-in face directly in contact with said traveling bed, holding said shell in position on said bed by a vacuum, and cutting away a sufficient amount of backing metal to produce an electrotype of the desired thickness.

4. In a method of making electrotypes, the steps which comprise filling in the intaglio portions of the printing face of a backed shell with plaster of Paris so that the filled-in portions will be flush with the printing surfaces of said printing face, positioning the thus-treated backed shell diagonally on a traveling bed of a milling machine with the filled-in face directly in contact with said traveling bed so that one corner of the shell passes beneath the cutter at the beginning of the cutting operation, holding said shell in position on said bed by a vacuum, and cutting away a sufficient amount of backing metal to produce an electrotype of the desired thickness.

GEORGE W. BUNGAY.